(12) United States Patent
Milligan et al.

(10) Patent No.: US 7,590,988 B2
(45) Date of Patent: Sep. 15, 2009

(54) DYNAMIC SERVICE GENERATION FOR LEGACY COMPONENTS

(75) Inventors: Andrew D. Milligan, Redmond, WA (US); Donald F. Box, Bellevue, WA (US); Harris Syed, Kirkland, WA (US); Max Attar Feingold, Bellevue, WA (US); Saji Abraham, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 11/075,417

(22) Filed: Mar. 8, 2005

(65) Prior Publication Data

US 2006/0206599 A1    Sep. 14, 2006

(51) Int. Cl.
  G06F 3/00    (2006.01)
  G06F 7/00    (2006.01)
  G06F 15/177  (2006.01)
  G06F 9/44    (2006.01)

(52) U.S. Cl. .......................... 719/328; 707/9; 709/220; 717/100

(58) Field of Classification Search ................. 719/310, 719/318, 328; 709/219, 220; 714/36; 707/9; 717/100
  See application file for complete search history.

(56) References Cited

U.S. PATENT DOCUMENTS

| | | | |
|---|---|---|---|
| 6,049,819 A | 4/2000 | Buckle | |
| 6,792,605 B1 | 9/2004 | Roberts | 719/313 |
| 6,993,585 B1 | 1/2006 | Starkovich | |
| 7,188,163 B2 * | 3/2007 | Srinivasan et al. | 709/221 |
| 7,266,550 B2 * | 9/2007 | Dumitru et al. | 707/4 |
| 7,284,039 B2 * | 10/2007 | Berkland et al. | 709/219 |
| 2002/0116454 A1 | 8/2002 | Dyla | |
| 2002/0152210 A1 * | 10/2002 | Johnson et al. | 707/9 |
| 2002/0178290 A1 | 11/2002 | Coulthard | |
| 2003/0105884 A1 | 6/2003 | Upton | |
| 2004/0117439 A1 * | 6/2004 | Levett et al. | 709/203 |
| 2005/0091639 A1 | 4/2005 | Patel | |
| 2006/0206567 A1 | 9/2006 | Milligan | |

OTHER PUBLICATIONS

Pham Huy, Hoang *Web Services Gateway-a step forward to e-business*, Proceedings of the IEEE International Conference on Web Services, Jul. 6, 2004.

(Continued)

*Primary Examiner*—Lechi Truong
(74) *Attorney, Agent, or Firm*—Workman Nydegger

(57) ABSTRACT

The present invention provides a mechanism that allows an administrative event to trigger or cause the generation of a dynamic web service during initialization of legacy application components. Similar to other types of static tooling approaches, the dynamic approach—as supported herein—uses available metadata describing an interface for communicating with legacy components. Rather than generating and manifesting the web service via tooling on a one time or occasional bases, however, example embodiments provide for the generation of the web service by the supporting infrastructure as a standard part of application initialization. Upon stopping the application, a termination sequence is provided that stops the corresponding dynamic web service and deletes the web service description used to generate the dynamic web service. Accordingly, every time the application is started the available metadata will need to be consulted and a consistent service will be built on-the-fly.

18 Claims, 3 Drawing Sheets

OTHER PUBLICATIONS

Li M., et al. *Leveraging legacy codes to distributed problem-solving environments: a Web services approach*, Software-Practice and Experience, Published online Aug. 25, 2004 in Wiley InterScience. vol. 34. No. 13.

Microsoft, Platform SDK: Microsoft Interface Definition Language (MIDL), Oct. 2004, pp. 1-2, available at msdn.microsoft.com/library/default.asp?url=library/en-us/midl/midl/call_as.asp.

Microsoft, The OLE Handler, date unknown - Copyright 2005 Microsoft Corporation, available at msdn.microsoft.com/library/default.asp?url=library/en-us/com/htm/handlers_8njm.asp.

Bisbal, Jesus et al., "Legacy Information System Migration: A Brief Review for Problems, Solutions and Research Issues," Computer Science Department Report, No. 38, Trinity College, Dublin, Ireland, 1999, pp. 1-18.

Naveen, Yajaman. Microsoft Corporation. Patterns & Practices. Web Service Facade for Legacy Applications [online], Jun. 2003 [retrieved on Nov. 15, 2008] Retrieved from the Internet<URL: msdn.microsoft.com/en-us/library/ms979218.aspx>.

Office Action dated Nov. 28, 2008 cited in U.S. Appl. No. 11/074,619.

Notice of Allowance dated Apr. 9, 2009 cited in U.S. Appl. No, 11/074,619.

* cited by examiner

DYNAMIC SERVICE GENERATION FOR LEGACY COMPONENTS

CROSS-REFERENCE TO RELATED APPLICATIONS

N/A

BACKGROUND OF THE INVENTION

1. The Field of the Invention

The present invention generally relates to web services. More specifically, the present invention provides for generating a dynamic web service for legacy application components that are not developed to communicate within a web service environment.

2. Background and Related Art

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Web services have been a driving force in advancing such communications between computer systems and are turning the way we build and use software inside-out.

Web services let applications share data, and-more powerfully-invoke capabilities from other applications without regard to how those applications were built, what operating system or platform they run on, and what devices are used to access them. Web services are invoked over the Internet by means of industry-standard protocols including SOAP (Simple Open Access Protocol), XML (extensible Markup Language), UDDI (Universal Description Discovery Integration), WSDL (Web Service Description Language), etc. Although web services remain independent of each other, they can loosely link themselves into a collaborating group that performs a particular task.

Often, electronic communication on a web service network includes a client computer system (hereafter referred to as a "client") requesting access to a network service (e.g., web services) at a server computer system (hereinafter referred to as a "server," "service," or "web service"). Accordingly, the client sends a request to the service for particular access to its system resources, wherein if the client is authorized and validated, the service responds with a response message providing the desired information. Of course, other messaging patterns between client and service are available and include simple singleton messages as well as more sophisticated multi-message exchanges like, e.g., notifications, solicit-response, pub-sub patterns, polling, kick-push, queuing, and others. Further, these types of communication are governed by various requirements and capabilities defined by both the client and the service in contracts for distributed systems (e.g., web services).

A contract is an expression of visible aspects of a service (or client) behavior. A contract is represented by a mixture of machine-readable and human languages. Besides the obvious opportunity for additional precision, machine-readable languages enable tooling to construct partial service implementations, automate service deployment, audit/validate messages exchanged, manage services, and enable a host of other network-related functions. Due, however, to limitations in the expressive power of machine-readable languages, human languages remain an important component of contracts-principally to describe message and message exchange pattern semantics.

Network Protocol Description Languages (e.g., WSDL) provide an overall wrapper or specification for describing contracts (e.g., web services Contracts) in a common or standard language. Such specifications make it easy for developers and developer tools to create and interpret contracts. These Network Protocol Description Languages (hereinafter referred to as "NPDL") have extensive tooling suites, which in large part accounts for their popularity.

Prior to the advent of web services, and over many years, a significant number of distributed applications have been written using legacy component based architectures from various vendors (e.g., COM (Component Object Model), DCOM (Distributed Component Object Model), CORBA (Common Object Request Broker Architecture)). With the arrival and advancement of standards based web services, however, there is interest in exposing the business logic from these legacy components as web services. As an example, and irrespective of the approach followed, the intention is typically to take an application component such as the one that supports the following interface:

```
Interface IStockSystem : IDispatch {
    HRESULT GetProductDescription(
        [in] BSTR ProductID,
        [out, retval] BSTR *ProdDesc) ;
    HRESULT GetProductInventory (
        [in] BSTR ProductID,
        [out, retval] short *ProdCount) ;
} ;
``` and produced from that component definition, a corresponding web service layer with a couple of operations illustrated in the following WSDL fragment:

```
< wsdl:portType name="StockSystem">
    <wsdl:operation name="GetProductDescription">
        <wsdl:input message="tns:GetProductDescriptionIn" />
        <wsdl:output message="tns:GetProductDescriptionOut" />
    </wsdl:operation>
    <wsdl:operation name="GetProductInventory">
        <wsdl:input message= "tns:GetProductInventoryIn" />
        <wsdl:output message= "tns:GetProductInventoryOut" />
    </wsdl:operation>
</wsdl:portType>
```

To date, there are only a couple of primary patterns or approaches that have been followed for converting or using legacy components within a web service environment. One approach is a migration or modification, which requires a developer to modify the component source code to add web service support. When the application is compiled and executed, the application will start with the appropriate web service support while still allowing traditional clients to connect to the underlying application.

Another approach is a tooling and metadata driven approach, which produces a static wrapping service. Rather than requiring components source code modification, this approach uses a more external approach to examine existing registered metadata for a component to determine the service that component should offer. This produces a static web service wrapper that is external to but, at least initially, consistent with the underlying unmodified component.

Although the above modified and static approaches have enabled the business logic of legacy components to be accessed in a web service environment, there are several shortcomings and problems associated with both of these approaches. For example, since the modified approach requires source code modification—even when there is no desire to change the business—logic this is a development task rather than a simple administrative procedure. Accordingly, such a task is beyond the scope of a typical administrator role and requires an additional skill set. In addition, the development modification to enable web services may not be available using the original coding environment. For instance, in the case of modifying a component written using a legacy language that is no longer supported, the component first has to be ported to a current language. Accordingly, a modification that looks initially like adding an attribute to a method is in fact a migration to a different language, runtime, and development environment.

In the static tooling approach, a problem exists when the underlying component is modified or a new version deployed. In such instance, the change will not automatically be reflected in the wrapping service until the service is regenerated. In addition, for web service operations, there is an explicit dependency between the service and the underlying component. Accordingly, care must be taken to ensure that the lifetimes of the component and the web service are synchronized (i.e., the wrapping service requires the component to be active and the component requires the wrapper to be active). Further, depending upon the environment and the external nature of the wrapper, there is typically an additional component to be deployed and administered. In other words, if the components are moved to another machine, the wrapper components must also be identified and moved accordingly.

For at least the foregoing reasons, there exists a need for providing web services and business logic for legacy components without requiring a developer to modify the underlying component source code, allowing for component modification or versioning, as well as supporting the explicit dependency between the service and the underlying component.

BRIEF SUMMARY OF THE INVENTION

The above-identified deficiencies and drawbacks of systems that provide services and business logic for legacy components in a web service environment are overcome through exemplary embodiments of the present invention. For example, the present invention provides for generating a dynamic web service for legacy application components that are not developed to communicate within a web service environment by allowing an administrative event to cause the generation of the dynamic web service during initialization of the legacy application components.

Example embodiments provide for receiving a request to initialize an application. The application includes one or more legacy components that are not developed to communicate with web service applications. Upon initialization, an administrative configuration setting is identified that indicates that a dynamic web service for the one or more legacy components is to be generated upon the initialization of the application. Based on the administrative configuration setting, metadata that describes an interface for communicating with the one or more legacy components is accessed. The metadata can then be used to automatically generate the dynamic web service consistent with the interface description for allowing a web service client to communicate with the one or more legacy components through a translation process.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
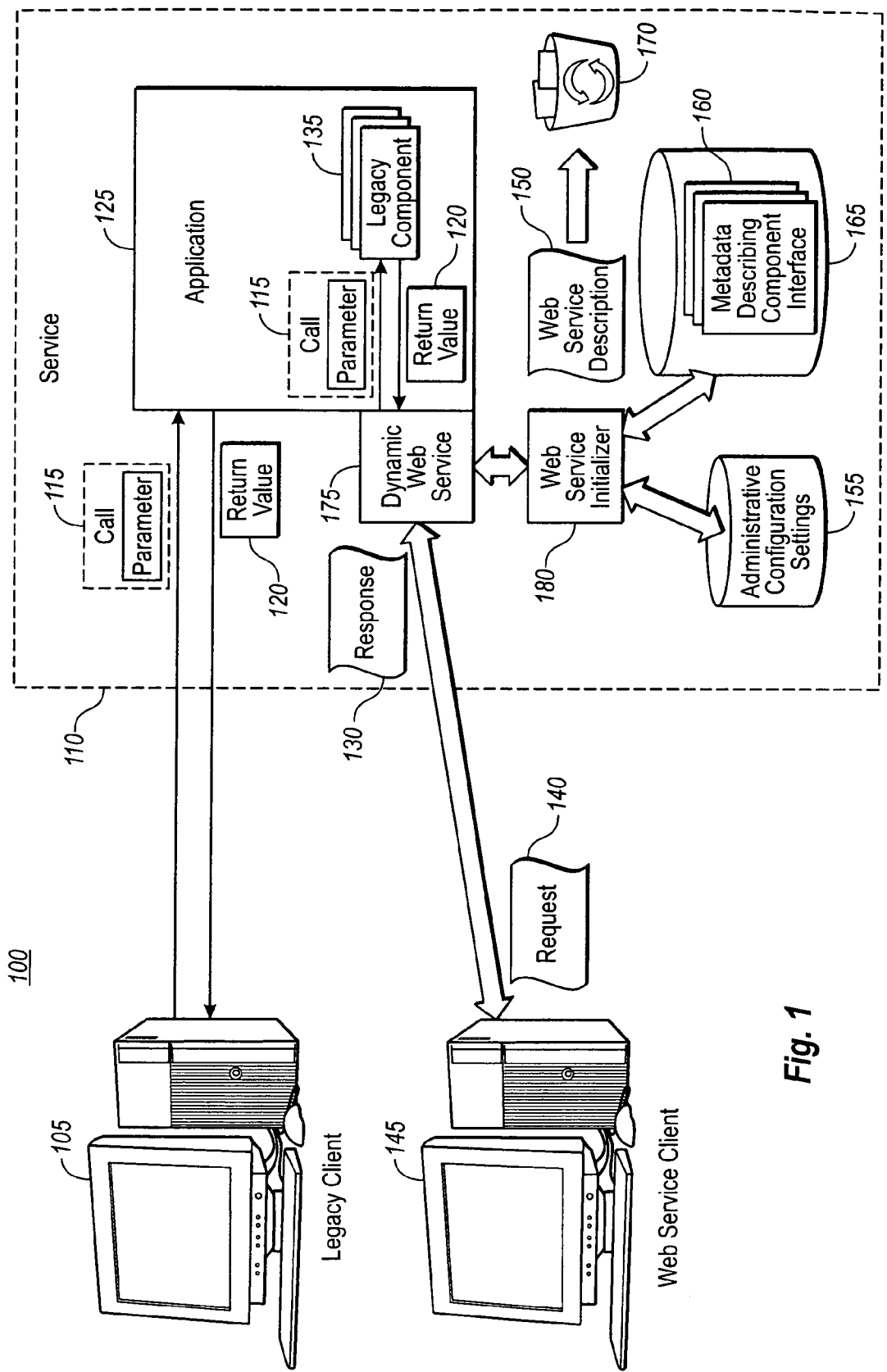
FIG. 1 illustrates a distributed system configured to create a dynamic web service in accordance with example embodiments of the present invention.

The present invention extends to methods, systems, and computer program products for generating a dynamic web service for legacy application components that are not developed to communicate within a web service environment. The embodiments of the present invention may comprise a special-purpose or general-purpose computer including various computer hardware components or modules, as discussed in greater detail below.

The present invention provides a mechanism that allows an administrative event to trigger or cause the generation of a dynamic web service during initialization of legacy application components. Similar to other types of static tooling approaches, the dynamic approach—as supported herein—uses available metadata describing an interface for communicating with legacy components. Rather than generating and manifesting the web service via tooling on one-time or occasional basis, example embodiments provide for the generation of the web service by the supporting infrastructure as a standard part of application initialization. Upon stopping the application, a termination sequence is provided that stops the corresponding dynamic web service and deletes the web service description used to generate the dynamic web service. Accordingly, every time the application is started the available metadata will need to be consulted and a consistent service will be built on-the-fly.

The dynamic approach for generating web services has several advantages over prior art systems. For example, since there is no modification to the original component, the dynamic approach enables web services through an administrative operation. This administrative operation may be a simple configuration utility that will enable web services upon startup of an application. By allowing the web service to be generated based on a configuration setting, an administrator can cause the creation of the dynamic web service without requiring a higher developer skill set. Further, because there is no code level migration effort required, the supporting infrastructure for the legacy component allows it to remain in the corresponding legacy language.

In addition, the dynamic approach as described in accordance with example embodiments has the following advantages over the static tooling approach. First, irrespective of when the underlying component is modified or a new version developed, a web service consistent with the component definition will always be produced. Accordingly, there is no longer scope for having a component running that is out of sync with the web service. In addition, the lifetime of the service can easily be tightly coupled to the lifetime of the legacy components since the dynamic web service startup (and generation) is now part of the component startup. Another advantage is there is no additional wrapper component to deploy and administer. This is due to the fact that, as described in greater detail below, when the application is not running there is no manifestation of the service. Accordingly, the dynamic web service will be generated as required so that it can be guaranteed to always be in place. In other words, there is no need to transpose web service components along with the legacy components when transferring between machines.

FIG. 1 illustrates various exemplary embodiments as described above. As shown, a distributed system 100 is provided that supports both web service clients 145 and legacy clients 105, thereby allowing access to a service 110 oriented application 125. More specifically, a service 110 is provided with an application 125 that includes legacy components 135. Example embodiments allow an administrator (not shown) to set administrative configuration settings 155, which indicate that a dynamic web service 175 should be generated upon startup of application 125. Accordingly, based on the administrative configuration settings 155, upon application 125 startup (and subject possibly to other configurations pulled from an application specific configuration file) a web service initializer 180 will access metadata 160 from catalogue database 165. Note that example embodiments allow for several ways for the initialization of application 125 (and the corresponding dynamic web service 175). For example, the request for initialization of application 125 may be received through input from an administrator user interface. Other example embodiments provide for automatically initializing the application 125 upon receipt of a request 140 (or other similar type requests) for access to services provided by application 125. Of course other well known ways of initialization applications 125 are also available to the present invention. Accordingly any specific manner or process for initializing application 125 is for illustrative purposes only and is not meant to limit or otherwise narrow the scope of the present invention unless explicitly claimed.

Regardless of how the application 125 is initialized, as previously mentioned, upon initialization metadata describing component interface 160 is accessed. This metadata 160 is information for how dynamic web service 175 is to communicate with the legacy component 135. In other words, the metadata 160 indicates, among other things, one or more of: what calls 115 are required for the legacy component 135; what parameters 115 to pass to the legacy component 135; what order the parameters 115 should be passed in; and a message exchange pattern, which indicates, e.g., if a return value 120 is to be received from the legacy component 135.

Note, that not all calls will include parameters. For example, an operation of FormatAllAvailableDisks( ) and other calls require no parameters. Accordingly, the metadata 160 may or may not have details on parameters 115 to pass to the legacy components 135, depending of course on the type of call to be made.

In any event, upon accessing the metadata 160, web service initializer 180 can generate a web service description 150 or contract (e.g., a WSDL document). In addition, the web service initializer 180 will start the dynamic web service 175 during runtime using the web service description 150. In addition, it may be necessary to use the web service description 150 to create web service clients 145 consistent therewith. Note that although the web service description 150 generated was used to create the dynamic web service 175, such an event is not critical to the present invention. In other words, the web service initializer 180 upon accessing the metadata 160 may automatically generate the dynamic web service 175, without the use of the web service description 150. Accordingly, the use of the web service description 150 for generating the dynamic web service 175 is for illustrative purposes only and is not meant to limit or otherwise narrow the scope of the present invention unless explicitly claimed.

Once the dynamic web service 175 is created and the legacy components 135 are active, a web service client 145 can make a request 140 for accessing services provided by legacy components 135. The request 140 may include such things as operations for requesting service offered by the legacy component 135 and/or the parameters 115 that the legacy component 135 needs, if any. Upon receiving request 140 and based on the operations within the request, dynamic web service 175 examines the request's 140's content and makes the appropriate calls 115 with the appropriate parameters (if any) to the legacy components 135. In other words, dynamic web service 175 acts as a translator between a common web service request message 140 (e.g., an XML document), and the appropriate calls and required parameters 115, if any, for communicating with the legacy components 135.

As previously mentioned, in addition to the appropriate calls and required parameters 115, if any, the dynamic web service 175 should be configured to know the appropriate message exchange pattern for the legacy component 135. Accordingly, if a return value 120 is required, the dynamic web service 175 will expect such a return. This return value 120 can then be formatted within an appropriate web service response 130, which is generated by the dynamic web service 175. Note that although the message exchange pattern for this example is a request-response, other message exchange patterns are also available to the present invention. Accordingly, the use of any particular type of message exchange pattern as described herein is for illustrative purposes only and is not meant to limit or otherwise narrow the scope of the present invention unless explicitly claimed.

Other example embodiments provide for a termination sequence for application 125. When the legacy application 125 is shut down or stopped, exemplary embodiments provide for terminating the dynamic web service 175 and deleting the web services description 150, e.g., by sending it to the recycling bin 170. Accordingly, since the web service description 150 is not persisted, and/or reused, there will be no inconsistencies if legacy components 175 are modified or updated versions are provided.

Note that the present invention also supports legacy client 105. Accordingly, the legacy client 105 can make the appropriate calls with the appropriate parameters 115, if any, directly to the legacy application 125. The return values 120

(if any) can also be delivered directly to the legacy client 105 from the legacy application 125.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flowchart for FIG. 2—is used to indicate the desired specific use of such terms.

Figure 2:
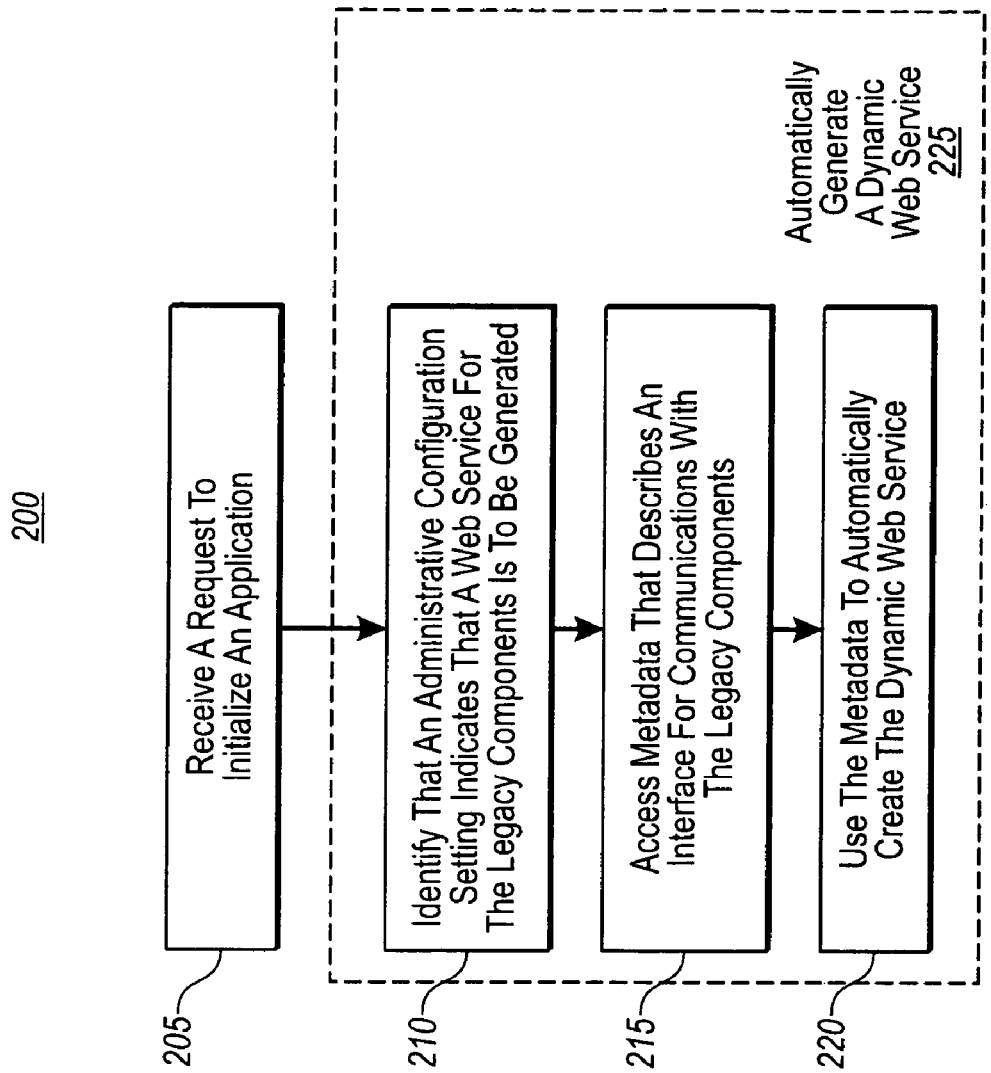
FIG. 2 illustrates a flow diagram for a method of generating a dynamic web service for legacy application components in accordance with example embodiments of the present invention.

FIG. 2 illustrates a flowchart for various exemplary embodiments of the present invention. The following description of FIG. 2 will occasionally refer to corresponding elements from FIG. 1. Although reference may be made to a specific element from this Figure, such elements are used for illustrative purposes only and are not meant to limit or otherwise narrow the scope of the present invention unless explicitly claimed.

FIG. 2 illustrates a flow diagram for a method 200 of generating a dynamic web service for legacy application components that are not developed, designed, or coded to communicate within a web service environment. These embodiments allow an administrative event to trigger the generation of the dynamic web service during initialization of the legacy application components. Method 200 includes an act of receiving 205 a request to initialize an application. For example, service 110 may receive a request to initialize application 125. The application 125 will include legacy components 135 that are not developed to communicate with web service applications, e.g., web service client 145. This request to initialize the application may be received in response to a web service request message 140 from a web service client 145 or may be received in response to input from a user interface at the service 110 computing device.

Method 200 also includes a step for automatically generating 225 a dynamic web service. Step for 225 includes an act of identifying 210 that an administrative configuration setting indicates that a dynamic web service for the legacy components is to be generated. For example, web service initializer 180 can access the administrative configuration settings 155 for identifying that a dynamic web service 175 for the legacy components 135 is to be generated upon the initialization of application 125.

Based on the administrative configuration setting, step for 225 further includes an act of accessing 215 metadata that describes an interface for communicating with the legacy components. For instance, based on the administrative settings 155, web service initializer 180 can access metadata describing component interface 160 from catalog database 165. The metadata 160 should describe such things as the appropriate calls 115, parameters 115, and parameter 115 ordering the dynamic web service 175 will use to communicate with the legacy component 135. The description of the component interface 160 may also include information such as message exchange patterns for legacy components 135.

Finally, step for 225 includes an act of using 220 the metadata to automatically create the dynamic web service. In other words, web services initializer 180 can create a web service description 150, which may be used to create dynamic web service 175. In such an embodiment, the web service description may be a WSDL document.

Other example embodiments provide for receiving a web service request message 140 from the web service client 145. The web service request message 140 may include various parameters and operations for requesting service offered by legacy components 135. Using information within the web service request message 140, the dynamic web service 175 can make legacy calls 115 to the legacy components 135 and pass the appropriate parameters 115, if any, to the legacy components 135 for further processing.

Still other example embodiments provide that based on the interface; description 160, a message exchange pattern may be identified for the legacy components 135, wherein a response 130 is required for the web service client 145. Thereafter, dynamic web service 175 may receive a return value 120 from the legacy component 135, wherein the dynamic web service 175 formats return value 120 into a web service response message 130. Accordingly, the response message 130 may then be sent to the web service client 145 for further processing. Note that the request 140 and response 130 will typically be XML documents.

Still yet other example embodiments provide for receiving a request to stop the application 125. Based on the request to stop the application 125, the dynamic web service 175 is also automatically stopped. In addition, the web service description 150 is deleted such that a new dynamic web service 175 and a new web service description 150 will be generated upon the next initialization of the application 125.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise computer storage media or communication media. Computer storage media comprise RAM, ROM, EEPROM, CD-ROM or other optical disk storage, magnetic disk storage or other magnetic storage devices. In contrast, when information is transferred or provided over a network or another communications connection (either hardwired, wireless, or a combination of hardwired or wireless) to a computer, the computer properly views the connection as a communication medium. Combinations of computer storage media and communication media should also be included within the scope of computer-readable media. Computer-executable instructions comprise, for example, instructions and data which cause a general purpose computer, special purpose computer, or special purpose processing device to perform a certain function or group of functions.

Figure 3:
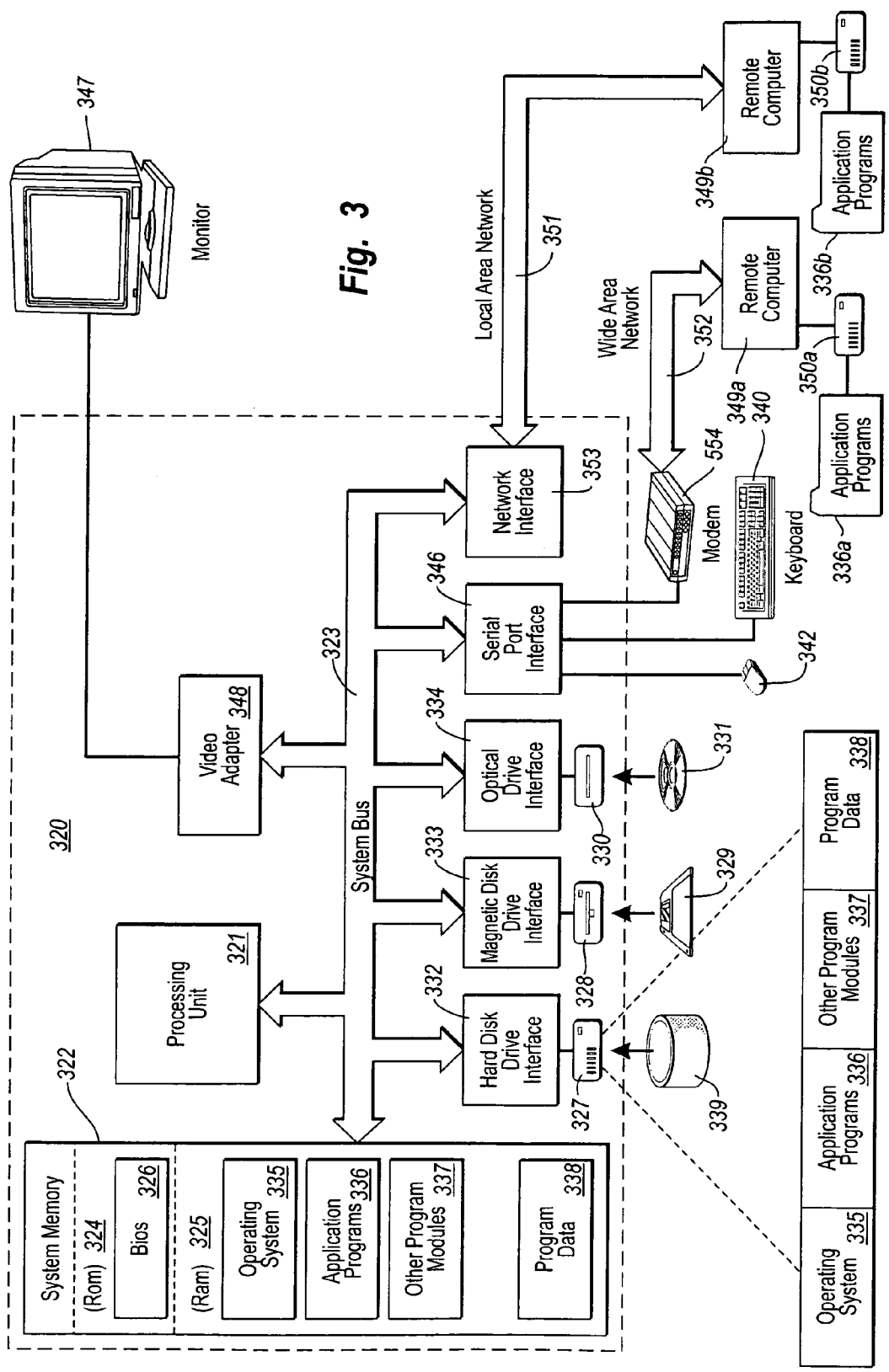
FIG. 3 illustrates an example system that provides a suitable operating environment for the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of generating a dynamic web service for legacy application components that are not developed to communicate within a web service environment by allowing an administrative event to cause the generation of the dynamic web service during initialization of the legacy application components, the method comprising acts of:

receiving, at a computer, a request to initialize an application, the application including one or more legacy components of the legacy application components that are not developed to communicate with web service clients of the web service environment;

based on the initializing of the application that initializes the one or more legacy components, identifying that an administrative configuration setting indicates that the dynamic web service for the one or more legacy components is to be generated upon the initialization of the application;

based on the administrative configuration setting of the administrative event, accessing metadata that describes an interface description for communicating with the one or more legacy components;

using the metadata to automatically generate the dynamic web service consistent with the interface description for allowing the web service clients of the web service environment to communicate with the one or more legacy components through a translation process;

receiving a web service request message from the web service clients, the web service request message including one or more operations for requesting services offered by the one or more legacy components;

based on the one or more operations, using the dynamic web service to make one or more legacy calls to the one or more legacy components; and upon termination of the application, automatically terminating the dynamic web service such that upon subsequent initialization of the application, the dynamic web service is regenerated based on the metadata that exists at a time of the subsequent initialization such that any changes to the interface descriptor for communicating with the one or more legacy components that occurred subsequent to the initialization of the application will be reflected in the regenerated dynamic web service.

2. The method of claim 1, wherein the web service request message further includes one or more parameters, the method further including an act of:

passing the one or more parameters to one or more of the one or more legacy components for further processing.

3. The method of claim 1, further comprising acts of:

based on the interface description, identifying that a message exchange pattern for the one or more legacy components requires a response to the web service clients;

receiving one or more return values from the one or more legacy components;

using the dynamic web service to format the one or more return values into a web service response message; and sending the web service response message to the web service clients for further processing.

4. The method of claim 3, wherein the web service request message and the web service response message are XML documents.

5. The method of claim 1, wherein the interface description describes one or more of a call operation, a parameter, a parameter ordering, or a message exchange pattern for communicating with the one or more legacy components.

6. The method of claim 1, wherein the metadata is used to first generate a web service description, which is then used to generate the dynamic web service.

7. The method of claim 6, wherein the web service description is a WSDL document.

8. The method of claim 6, further comprising an act of:

upon determination of the application, deleting the web service description such that a new web service-description will be generated upon the subsequent initialization of the application.

9. The method of claim 1, wherein the request to initialize the application is received in response to the web service request message from the web service clients.

10. The method of claim 1, wherein the request to initialize the application is received in response to input from a user interface at the computer.

11. A method of generating a dynamic web service for legacy application components that are not developed to communicate within a web service environment by allowing an administrative event to cause the generation of the dynamic web service during initialization of the legacy application components, the method comprising:

receiving, at a computer, a request to initialize an application, the application including one or more legacy components of the legacy application components that are not developed to communicate with web service clients of the web service environment;

based on the initialization of the application that initializes the one or more legacy components, automatically generating a dynamic web service consistent with metadata that describes an interface description for communicating with the one or more legacy components, the dynamic web service used to allow the web service clients of the web service environment to communicate with the one or more legacy components through a translation process, wherein the metadata is provided by an administrative configuration setting of the administrative event that is accessed upon the initialization of the application;

receiving a web service request message from the web service clients, the web service request message including one or more operations for requesting services offered by the one or more legacy components;

based on the one or more operations, using the dynamic web service to make one or more legacy calls to the one or more legacy components; and upon termination of the application, automatically terminating the dynamic web service such that upon subsequent initialization of the application, the dynamic web service is regenerated consistent with the metadata that exists at a time of the subsequent initialization such that any changes to the interface descriptor for communicating with the one or more legacy components that occurred subsequent to the initialization of the application will be reflected in the regenerated dynamic web service.

12. The method of claim 11, wherein the metadata is used to first generate a web service description, which is then used to generate the dynamic web service.

13. The method of claim 12, further comprising an act of:

upon determination of the application, deleting the web service description such that a new web service-description will be generated upon the subsequent initialization of the application.

14. The method of claim 11, wherein the request to initialize the application is received in response to the web service request message from the web service clients.

15. A computer storage media storing computer executable instructions that, when executed by a processor, cause a distributed computing system to perform the following:

receive, at a computer, a request to initialize an application, the application including one or more legacy components that are not developed to communicate with web service clients;

based on the initializing of the application that initializes the one or more legacy components, identify that an administrative configuration setting indicates that a dynamic web service for the one or more legacy components is to be generated upon the initialization of the application;

based on the administrative configuration setting, access metadata that describes an interface description for communicating with the one or more legacy components; and use the metadata to automatically generate the dynamic web service consistent with the interface description for allowing the web service clients to communicate with the one or more legacy components through a translation process;

receive a web service request message from the web service clients, the web service request message including one or more operations for requesting services offered by the one or more legacy components;

based on the one or more operations, use the dynamic web service to make one or more legacy calls to the one or more legacy components; and upon termination of the application, automatically terminate the dynamic web service such that upon subsequent initialization of the application, the dynamic web service is regenerated based on the metadata that exists at a time of the subsequent initialization such that any changes to the interface description for communicating with the one or more legacy components that occurred subsequent to the initialization of the application will be reflected in the regenerated dynamic web service.

16. The computer storage media of claim 15, wherein the web service request message further includes one or more parameters, the computer storage media further storing a computer executable instruction that when executed by the processor, cause the distributed computing system to perform the following:

pass the one or more parameters to one or more of the one or more legacy components for further processing.

17. The computer storage media of claim 15, further storing computer executable instructions that when executed by the processor, cause the distributed computing system to perform the following:

based on the interface description, identify that a message exchange pattern for the one or more legacy components requires a response to the web service clients;

receive one or more return values from the one or more legacy components;

use the dynamic web service to format the one or more return values into a web service response message; and send the web service response message to the web service clients for further processing.

18. The computer storage media of claim 15, wherein the interface description describes one or more of a call operation, a parameter, or a message exchange pattern for communicating with the one or more legacy components.

* * * * *